April 19, 1966    R. HIRSCH    3,246,668
PROGRAMMED VALVE SYSTEM
Filed Dec. 13, 1960    4 Sheets-Sheet 1

INVENTOR.
BY RICHARD HIRSCH.
ATTORNEY.

INVENTOR.
RICHARD HIRSCH
BY
ATTORNEY.

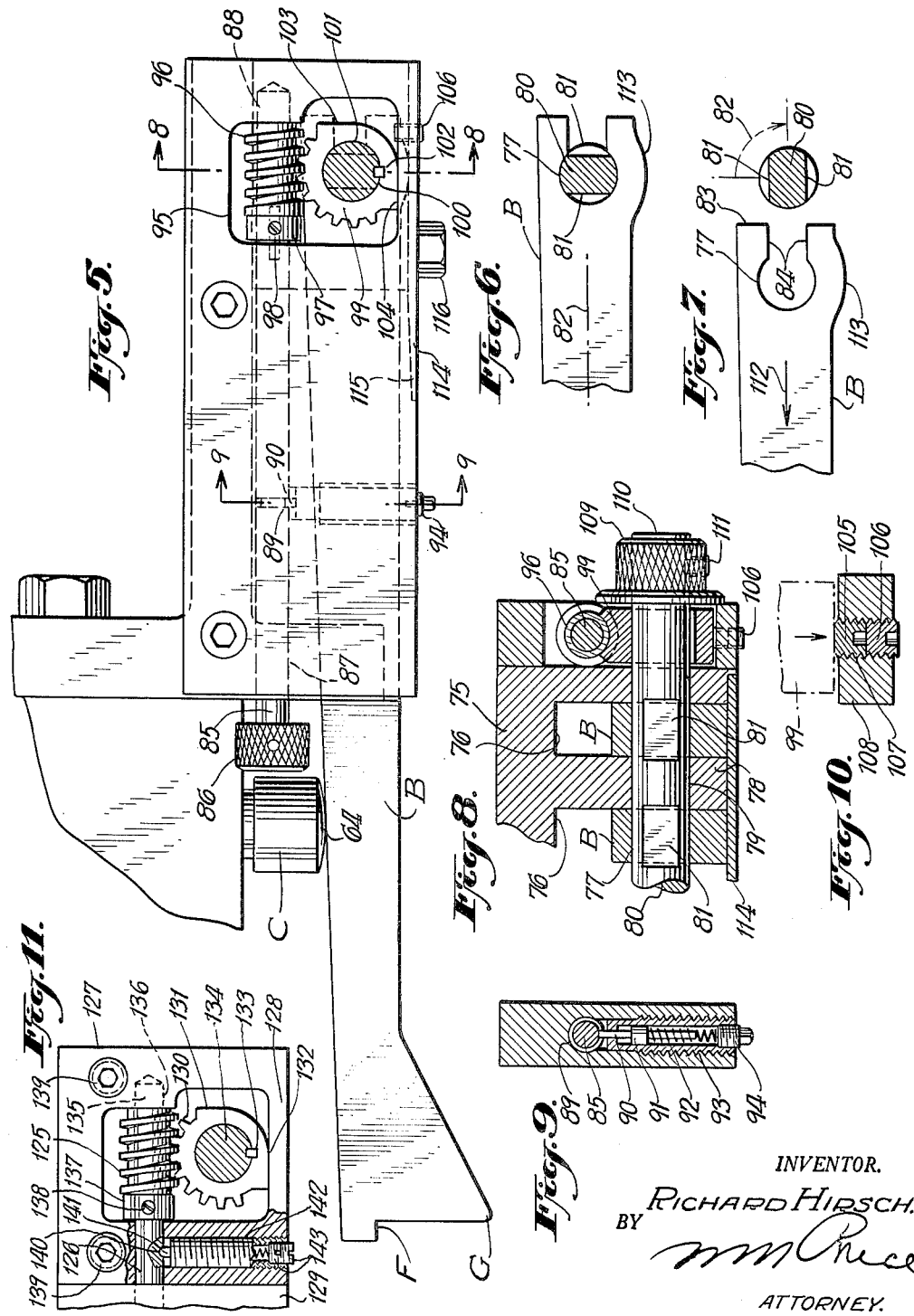

United States Patent Office 3,246,668
Patented Apr. 19, 1966

3,246,668
PROGRAMMED VALVE SYSTEM
Richard Hirsch, 1856 Edmund Road, Abington, Pa.
Filed Dec. 13, 1960, Ser. No. 75,609
17 Claims. (Cl. 137—315)

The present invention relates to glass forming machinery, and it particularly relates to the timer mechanism for such glass forming machinery.

In glass forming machinery, a predetermined sequence of operations is carried out in forming bottles or other glass objects by means of a timer drum.

Although not limited thereto, the present invention is particularly directed to the timer drum or timer mechanism of a glass machine in which the drum cooperates with a valve block located under the machine which will cause a sequential operation of the various operations in which there may be some nineteen operations in a typical machine.

For example, in a typical bottle forming machine by a series of pneumatic valves which are operated in sequence, there are performed the sequence of operations which may be termed, scoop operation, the blank closing operation, the thimble operation, the plunger operation, the funnel operation, the counterblow cooling operation, the settle blow baffle operation, the blank open operation, the invert operation, the neck ring coil operation, the reverting operation, the blow head operation, the final blow operation, the mold closing operation, the mold opening operation, the bottom plate up operation, the bottom plate down operation, the take out in operation and the final take out tongs closed operation.

Generally, these machines take a gob of glass in which a scoop mechanism is actuated to eject such glass into a proper section of a scoop with the gob of glass dropping by gravity from the scoop to the trough and to the deflector.

Normally, this delivery operation is followed by a settle blow operation and then by a counterblow operation which may involve several steps.

Essentially, during these operations, a gob of glass is formed into a container or recess structure following which the neck and other forming operations take place.

The essential feature of the machine is the valve block arrangement in which the various operations are controlled in respect to sequence and in which the pneumatic controls are operated so as to assure proper sequential and timed operations.

Where there are nineteen operations as in the usual machine, for example in the Ingle Patent No. 1,911,119, there will be a single driving power source which may be driven from the electric motor with a plurality of levers being provided and actuated by cams on the rotating drum or shaft member which will operate the pneumatic controls in the desired sequence and each for the desired time intervals.

It is among the primary objects of the present invention to provide a novel block arrangement in which it will be readily possible to repair or replace the various wearing parts therein so as to assure accurate and proper sequence of operation at all times.

Normally, the valve block by which the various operations are controlled is positioned below and internally of the complete machine, and to repair, replace or service the various elements thereof, it is necessary to stop the machine and partially dismantle the machine to permit proper servicing; and it is among the objects of the present invention to permit relatively prompt and effective repair and replacement of the valve block and timer elements associated therewith so that a prompt repair and replacement may be made without prolonged stoppage of the machine with the minimum of labor and a maximum of efficiency.

In these valve blocks, it has been found that the levers which operate and actuate the various pneumatic controls frequently become worn with the result that the manufacturing operation is affected, and the proper timing and sequence will not be obtained with the resultant product of defective glassware due to improper functioning of the valve.

It is among the objects of the present invention to provide means for rapidly and quickly replacing any lever or levers in such a machine upon breakage or wearing thereof without prolonged shutdown periods of six to eight hours or longer when it is necessary to remove the drums and the entire valve block for replacement of all of the levers.

It is, therefore, a particular object of the present invention to provide a valve block construction in which there may be replacement of any one or all of the levers with a total shutdown time not exceeding one hour and often much less and with a total shutdown time being reduced to a minimum.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects of the present invention according to one preferred embodiment thereof, the lever arrangements which control the valves and which are most subject to wear are carried on a shaft which in an operating position will hold all of said levers in position and prevent removal of such levers from the block.

These levers at their internal pivotally mounted ends are provided with slotted openings to enable removal for repair and replacement.

The shaft similarly is provided with flatted sides over which said slotted openings may be removed.

However, in normal operation, the shaft will be so turned that its full rounded position will be opposite the slot and prevent removal of the lever by the flats of the slot.

When however the lever has been worn or has become defective manual means are provided, accessible from the front of the machine, to turn the shaft by an angle of 90° to permit any one or more of the levers to be removed or replaced following which the shaft may be turned back to its original position and the operation of the machine resumed.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 5 is a side sectional view of the replaceable lever and its shaft arrangement.

FIG. 6 is an illustrative fragmentary side sectional view showing the shaft mount for the replaceable lever.

FIG. 7 is a diagrammatic side sectional view similar to FIG. 6 showing the manner in which the lever may be removed from its carrying shaft.

FIG. 8 is a transverse sectional view upon the line 8—8 of FIG. 5.

FIG. 9 is a transverse vertical sectional view upon the line 9—9 of FIG. 5.

FIG. 10 is a fragmentary transverse sectional view showing an adjustable stop arrangement to limit the turning of the shaft.

FIG. 11 is a fragmentary side elevational view of an alternative form of the worm and gear for rotating the shaft mount for the replaceable lever.

Figure 1:
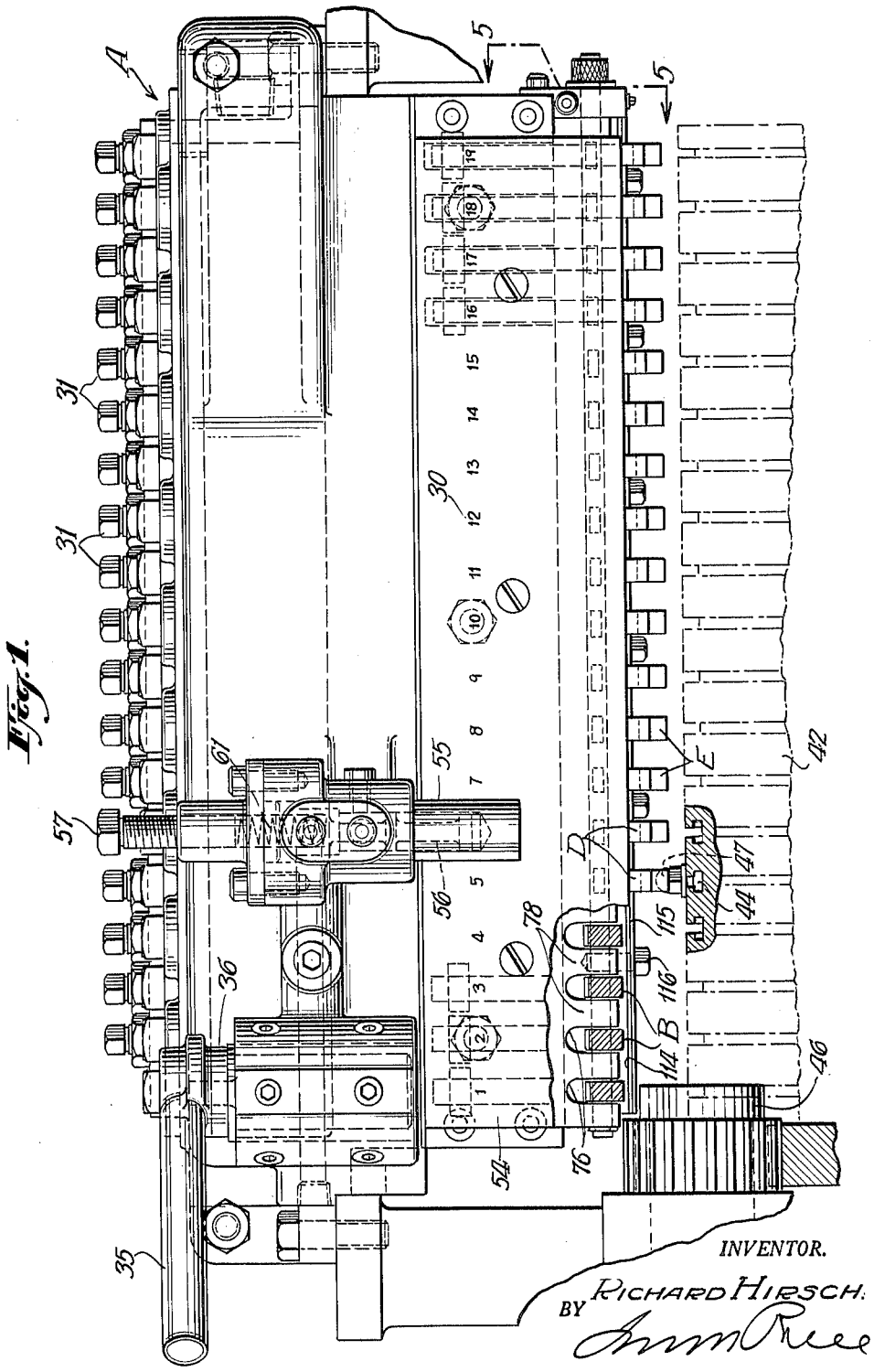
FIG. 1 is a front elevational view of a typical valve block which is normally positioned under and below the glass forming machine.
Figure 2:
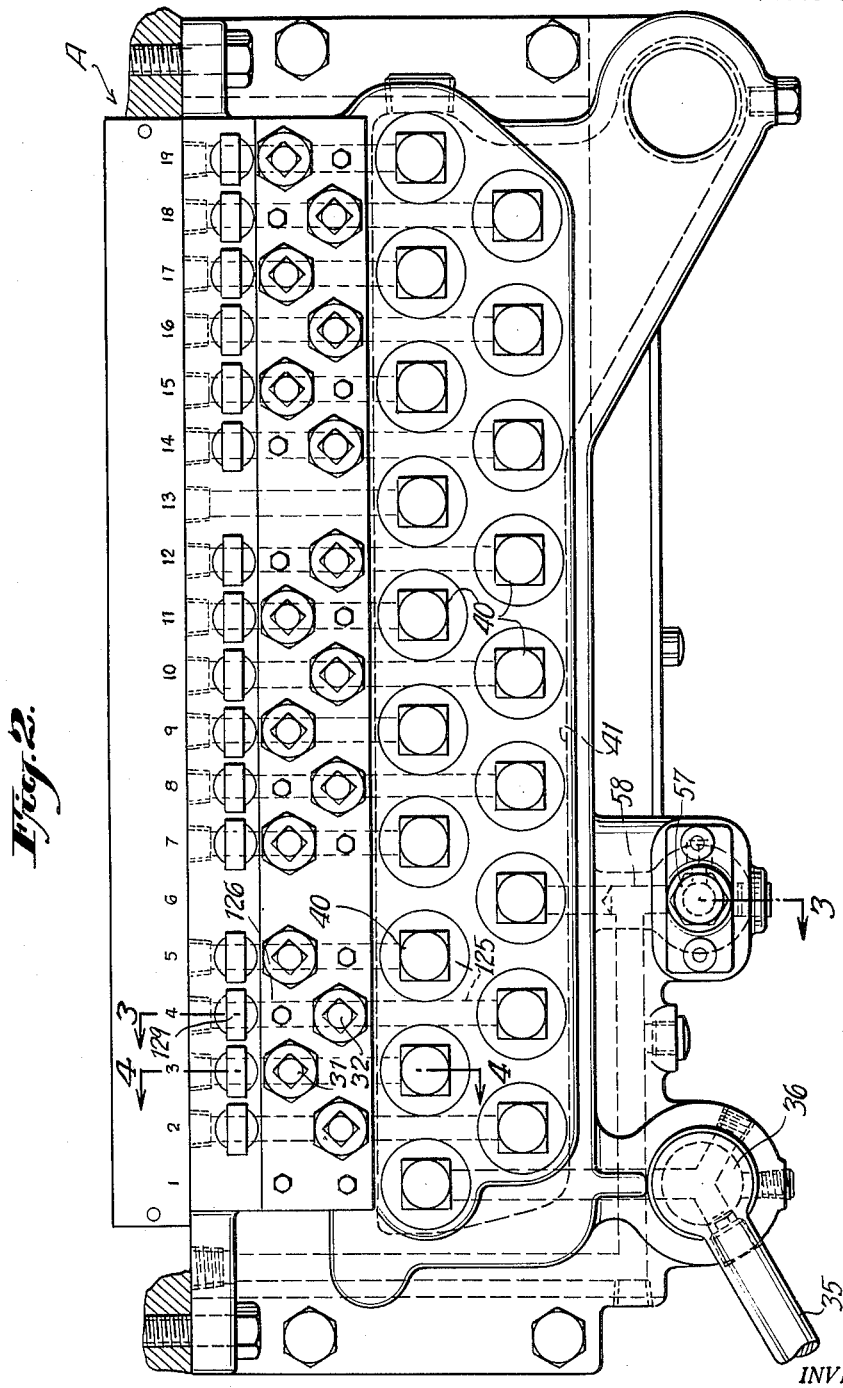
FIG. 2 is a top plan view of the valve block of FIG. 1.

Referring to FIGS. 1 and 2, there is shown a valve block A through which the various operations of the glass machine are controlled.

The valve block A has some nineteen valves positioned as indicated at 30.

Figure 3:
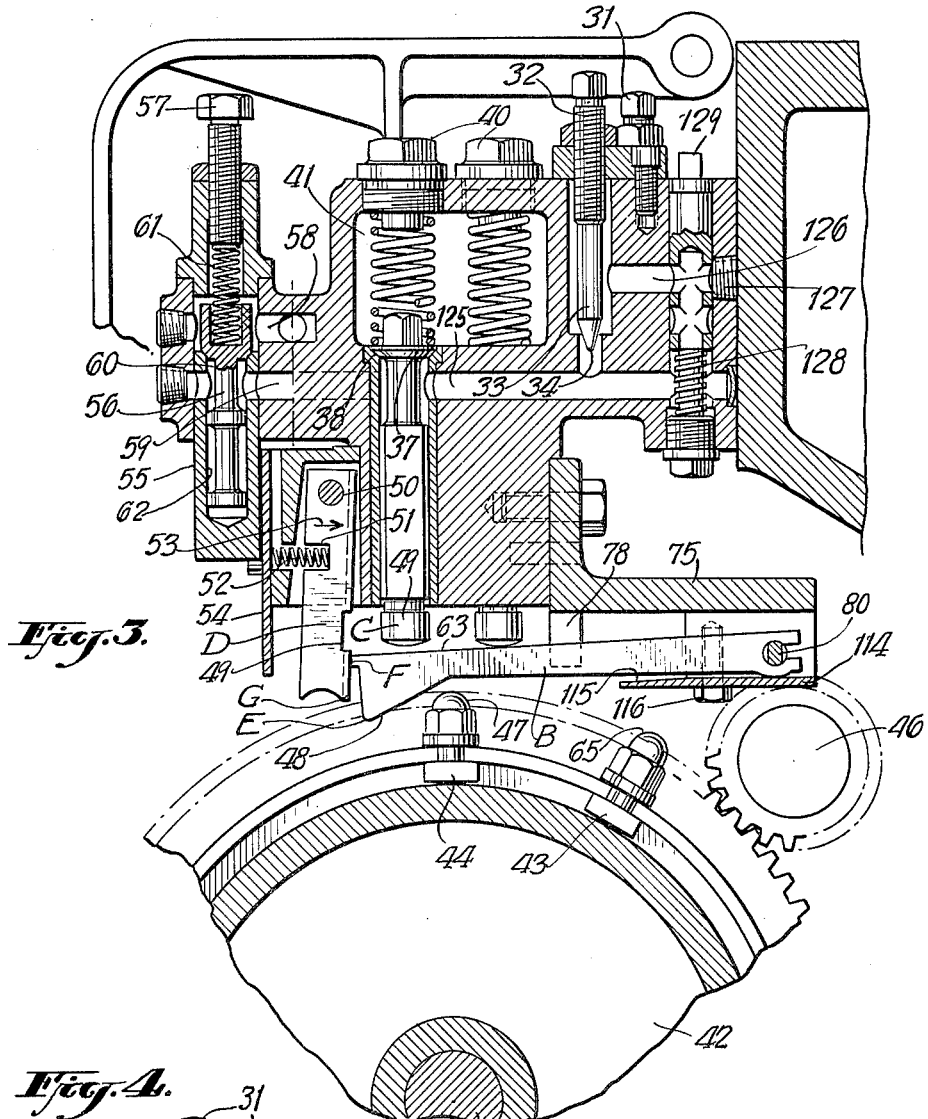
FIG. 3 is a transverse sectional view upon the line 3—3 of FIG. 2 showing the portion of the timer drum and the valve mechanism as actuated by the replaceable lever of the present invention.

As shown in FIG. 3, there will be a series of square heads 31 connected to the threaded members 32 which in turn are connected to the shafts 33 of the needle valves 34.

These members are offset from one another so as to permit compact displacement arrangement thereof.

Figure 4:
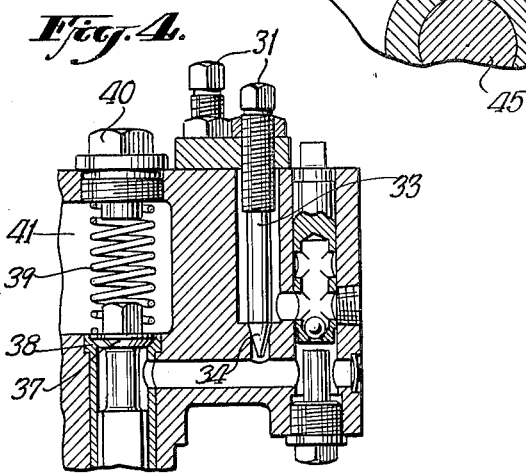
FIG. 4 is a fragmentary transverse sectional view upon the line 4—4 of FIG. 2 showing the air valve arrangement.

There will be a single air inlet indicated at 35 in FIG. 2 which is controlled by the three-way valve 36, and the air may then flow in past the valves 37 as shown in FIG. 4 which are pressed against their seats 38 by their spring 39 reacting against the plugs 40.

The valve chamber 41 will normally receive the air under pressure, and the opening of the valve 37 from their seats 38 will be determined by the operation of the timer drum 42 shown in FIG. 3.

The timer drum 42 as shown in FIG. 3 has a plurality of cam contact members 43 and 44 thereon which are designed to move against the lever B and cause it to actuate a presser head C and to be latched into position, with the vertical swinging latch D.

The second contact releases the latch D and permits the lever B to drop to the position indicated.

The principal wear takes place at the points E and F on the lever B and at the position G on the latch D.

Referring particularly to FIGS. 4 and 5, the timer drum 42 will be driven on the shaft 45 by a gear 46 and each lever B will be provided with two sequential knobs or cam elements with the first element 44 serving to open the valve 37 and the second element 43 serving to close the valve 37.

As shown in FIG. 3, the element 44 has a knob 47 which will ride under the sloping face 48 of the lever B and cause the forwardly extending portion F of the lever B to latch into the recess 49 on the hanging lever D having the pivot 50.

This lever D has a recess 51 which receives the spring 52 and is normally biased in the direction 53.

The spring 52 and the pivot 50 are normally covered by the depending plate 54 and the front mechanism 55 which has the valve structure 56 and the adjustment 57 (see FIG. 3).

This front valve structure 60 will establish communications between the pneumatic or compressed air passages 58 and 59 and through the space 60 around the valve stem 56.

The spring 61 will normally bias the valve stem 56 downwardly.

The variation in the connections is achieved by the varying length of the recesses indicated at 60 and 62 on the valve stem 56.

When the bottom 47 advances over the oblique face 48, it will elevate the top portion 63 of the lever B to press up on the curved face 64 of the valve structure C.

At the same time the nose F will latch in the recess 49 and will hold the valve 37 open until the lever D releases the lever B.

This will be accomplished when the knob 65 strikes the lower corner G of the depending latch member D which will move the release 49 to the left permitting the lever B to drop.

If these operations take place repeatedly and at considerable frequency throughout the continued operation of the machine due to wear at the points E, F and G, the timing will gradually change, and the pneumatic pressure will be applied for longer and shorter periods than desired with production of defective glassware.

When this occurs, if it is necessary to lay up the entire machine for an entire shift for as long as eight to ten hours, there is a great loss in handling the glass, considerable difficulty is experienced in stopping and then subsequently starting the machine, and a great amount of labor is necessary to pull out the entire mechanism as shown in FIGS. 1 and 2 for replacement purposes.

The primary invention of the present application is directed to the arrangement for permitting replacement of the levers B without closing down the machine for any prolonged period and by relatively simple operation.

The essence of the invention is, therefore, disclosed in FIGS. 5 to 10.

Referring to FIGS. 5 to 10, each lever B is received in a plate structure 75 having bearing and guide slots 76 which receive the levers B.

In the form of the invention shown, there will be nineteen of these levers.

As is indicated, these levers are each provided with a bore bearing opening 77 there through while the extensions 78 of the plates 75 are also provided with the bore bearing extensions 79 through which the shaft 80 will extend.

The shaft 80 will carry all of the levers some nineteen in number, and at each lever B, the opposite sides of the shaft will be flatted as indicated at 81.

These flatted portions during normal operation of the machine will be turned transversely to the axis 82 of the lever B as indicated in FIGS. 6 and 7, and they will be held in this position.

When, however, there has been wear and it is necessary to replace one or more elements B, the shaft 80 will be turned at an angle of 90° as indicated by the arrow 82 in FIG. 7 so that the flats will now be parallel to the axis of the lever 82.

It will be noted that the bore 77 is not a closed bore but has a slotted opening at the back end 83 as indicated at 84 in FIG. 7.

This rotation of the shaft to permit release of the levers B is accomplished by means of the forwardly extending rod element 85 (see FIG. 5).

The forward end of the rod element 85 may be provided with a knurled head 86 for connection to a rotating member, or it may be provided with a fillister slot which will permit insertion of a screwdriver to rotate the same.

This shaft is held in position in the bearings 87 and 88, and it is fixed from longitudinal motion at the groove 89.

At the groove 89 as shown in FIG. 9, there may be a pin 90, the upper end of which will ride in the groove 89.

This pin is carried by a head 91 which is pressed upwardly by a spring 92.

The spring 92 and the head 91 are carried in the threaded recess 93 which is closed by the adjustment plug 94.

The adjustment plug 94 is accessible from the outside of the machine and will enable variation in the dimension on the spring 92 and will also enable removability of the pin 90 when it is desired to remove the rod 85.

The rod 85 in the gap 95 will carry a worm 96 (see FIG. 5).

This worm 96 is held in position by a spline connection or by the collar 97 and the set screws 98.

The worm 96 meshes with the partial gear 99 which is positioned by the opening 100 on the end 101 of the shaft 80 by the key 102.

This partial gear 99 has the stop faces 103 and 104 which will limit the movement of the gear 99 and the rotation of the shaft 80 so that it will assume either the position of FIG. 6 or the position of FIG. 7.

The stop position may be adjusted by the adjustable contact elements 105 and 106 which may be threaded into a tapped opening 107 in the bottom element 108 of the recess structure 95.

The entire unit may be held in position by the sleeve 109 on the end 110 of the shaft 80 provided with a set screw 111.

Referring particularly to FIGS. 5 to 10, when there is wear at the points F or G requiring replacement of one or more levers B, all that is necessary to do is to rotate the shaft 85 and 86 from the stop position of FIG. 5 until the face 103 contacts the adjustable stop 105.

This will turn the member 80 from the position of FIG. 6 to the position of FIG. 7.

Thereupon one or more levers B may be moved as indicated by the arrow 112 in FIG. 7 it being understood, of course, that the front structure as shown in FIG. 3 has been removed.

The bottom bulge 113 on the lower face of the lever will ride upon the plate 114 which has an oblique forward face 115 to enable ready replacement and removal of the levers and also to hold the levers in position.

This plate is held in position by the bolt 116 (see FIG. 3).

As soon as the new lever has been put in the shaft 85, it may be turned from the position of FIG. 7 to the position of FIG. 6, and the machine may be restarted.

The levers are readily guided into position by the plate 114 and over the beveled face 115, and they normally will not drop out of position when the shaft is turned as indicated in FIG. 7.

It will be noted that the air passes from the chamber 41 past the valve 37 through the passageway 125 past the needle valve 34 into the passageway 126 and then through the connection 127 to the proper mechanism in the machine.

The member 128 will control the passageway through which the air flows through the desired mechanism.

The ball check members are controlled by the element 129 of FIG. 3.

In the alternative form of FIG. 11, the partial gear 130 has the side stops 131 and 132 and is fixed to rotate the shaft 134 through the key 133.

The gear 130 is received in the central rectangular opening in the box-like frame structure 128. The forward section 129 may be connected to be mounted onto the box structure 127 by screws or bolts (not shown).

The shaft 126 turns within openings in the structural elements 129 and 127.

The shaft 126 carries the worm 125 which meshes with and drives the gear 130.

The shaft 126 is held in position by the collar 137 fixed in position by the set screw 138.

The box 127 is held in position by the screws 139. The shaft 126 has a recess 140 which receives the tit 141 pressed inwardly by the spring in the threaded sleeve 142. The double plug 143 enables adjustment of the spring tension on the tit 141.

The tit 141 will click once for each rotation of shaft 126 giving an audible signal of amount of rotation of shaft 126 in moving the gear from stop face 131 to stop face 132 to change from locking position to unlocking position of shaft 134.

It is thus apparent that the applicant has provided a simple readily accessible valve block repair and servicing device which will assure accurate timing of the machine and permit selective replacement of one or more of the timing arrangements without prolonged shutdown of the machine.

As many changes could be made in the above glass forming machinery, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. For use in a glass molding machine of the type having a timer drum with a plurality of pneumatic control valves arranged in side by side relationship and operated in sequence to control the formation of a blown glass object, said drum having reciprocatory push members, pneumatic valves actuated thereby, a lever system for operating said push members having readily removable pivotally connected levers to operate said push members, said timer drum operating said levers, characterized in that said levers are thin and flat in a direction transverse to the axis of the pivotal connection, said levers being vertically reciprocable and arranged in a closely spaced bank and have a guide structure to hold them in position adjacent said levers at their rear pivot ends, said levers each having a rear pivot end having a rear portion adjacent and below the pivot end guided by said guide structure and a rotatable pivot shaft engaging said pivot ends and a transverse shaft parallel to and at one side of said bank to rotate said pivot shaft to release said pivot ends, said rear portions being guided in their movement upon release, said shaft and the rear pivot ends of the levers rotatably mounted on said pivot shaft being so shaped in respect to each other that when the shaft is in one position the levers may be removed whereas when the shaft is turned to another position the levers are locked in position and can not be removed.

2. The system of claim 1, said transverse shaft having means immediate of its ends to hold it in position and having stop means adjacent the pivot to limit its rotation.

3. The system of claim 1, a box at the rear end of transverse shaft and adjacent end of the pivot shaft, said box including a gearing connection between said shaft and pivotal movements and means in said box to limit the motion of the pivotal shaft to about 90°.

4. The system of claim 1, said guide means being a shaft and said shaft at all times holding the pivot end of said lever so that it will be correctly positioned in respect to the pivot shaft.

5. The machine of claim 1, a box at the rear end of said actuator and adjacent end of the pivot shaft, said box including a gearing connection between said actuator and pivot shaft and means in said box to limit the motion of the pivot shaft to about 90°.

6. The machine of claim 1, a shelf to hold said pivot ends in position, said shelf at all times holding the pivot ends of each lever so that it will be correctly positioned in respect to the pivot shaft.

7. In a glass making machine, a bank of removable levers having forward ends to be grasped for removal and rear pivot ends, with pivot mount portions, consisting of a slotted opening and a circular pivot opening communicating with the slotted opening, a flatted pivot shaft extending through said circular openings and an oblique shelf extending under and contacting the downward rear pivot end portions, means to release pivot shaft by rotating the same and said rear pivot end portions being released by sliding them forwardly over the shelf, said levers being inaccessible except at their forward ends, said shaft and the rear pivot ends of the levers rotatably mounted on said pivot shaft being so shaped in respect to each other that when the shaft is in one position the levers may be removed whereas when the shaft is turned to another position the levers are locked in position and can not be removed.

8. The machine of claim 7, said means consisting of a transverse shaft extending parallelly to and above and to one side of said bank and a manual actuator for said transverse shaft at the forward end of the shaft.

9. The machine of claim 8, said transverse and pivot shafts having bearing ends meeting adjacent the pivot ends and a box having bearings to receive and supply bearings for said bearing ends and gearing connecting said bearing ends and having stop means to limit the amount of rotation of said shafts to 90°.

10. The machine of claim 7, said means consisting of a transverse shaft extending parallelly to and above and to one side of said bank.

11. For use in a glass molding machine of the type having a timer drum with a plurality of pneumatic control valves arranged in side by side relationship and operated in sequence to control the formation of a blown glass object, said drum having reciprocatory push members, pneumatic valves actuated thereby, a lever system for operating said push members which lever system is operated by said timer drum, said lever system including readily removable pivotally connected levers to operate said push members, said timer drum operating said levers, characterized in that said levers are vertically positioned in a direction transverse to the axis of the pivotal connection, said levers having rear pivot ends and forward drum actuated ends and said levers being removable and replaceable from said forward ends and their pivot ends being inaccessible, said levers being vertically reciprocable at their forward ends and arranged in a closely spaced bank, said rear pivot ends having a support extension adjacent and below the pivot end and a rotatable pivot shaft engaging said pivot ends and an actuator at one side of said bank to rotate said pivot shaft to release said pivot ends and a handle for said actuator adjacent the front ends of said levers, said shaft and the rear pivot ends of the levers rotatably mounted on said pivot shaft being so shaped in respect to each other that when the shaft is in one position the levers may be removed whereas when the shaft is turned to another position the levers are locked in position and can not be removed.

12. The machine of claim 11, said actuator having means intermediate of its ends to hold it in position and having stop means adjacent the pivot to limit its rotation.

13. In a glass making machine, a bank of removable levers having forward ends to be grasped for removal and rear pivot ends, each with a pivot mount portion, consisting of a slotted opening and a circular opening for forming a pivot around a pivot shaft communicating with said slotted opening, a pivot shaft extending through said circular openings and a guide extending under the pivot ends, said pivot shaft being flatted inside of said circular openings, means to release pivot shaft by rotating the same and said rear pivot end portions being released by sliding them forwardly over the guide, said levers being inaccessible except at their forward ends, said shaft and the rear pivot ends of the levers rotatably mounted on said pivot shaft being so shaped in respect to each other that when the shaft is in one position the levers may be removed whereas when the shaft is turned to another position the levers are locked in position and can not be removed.

14. A valve operating lever system for use with a glass molding machine of the type having a timer drum with a plurality of pneumatic control valves arranged in side by side relationship and operated in sequence to control the formation of a blown glass object, said drum having reciprocatory push members, pneumatic valves actuated thereby, the combination therewith of readily removable pivotally connected levers to operate said push members, said timer drum operating said levers, said lever system including a rotatable flatted shaft, each of said levers having a slotted pivot and pivotally mounting said lever on said shaft, said slotted pivot end of each lever being so shaped and dimensioned relative to flat portions on the shaft that when the shaft is in a predetermined rotative position each lever may be removed by pulling the lever forwardly so that the slot in the lever slides over the flat portions of the shaft and when the shaft is out of said predetermined rotative position removal of said levers is prevented and means to rotate said shaft to permit removal of the pivot ends over the flatted shaft positions, said levers being vertically reciprocable and thin and flat in the direction of the pivotal axis and being positioned closely spaced in side by side relationship, and stop means to stop the levers in their vertical movements, guide means positioned below the pivot ends of said levers to contact and guide the pivot ends of the levers upon removal movement and said stop means being positioned above the levers and at one side of the levers, and an actuator at the forward ends of the levers away from the pivot ends and adjustable elements to regulate the amount of movement of said levers.

15. A valve operating lever system for use with a glass molding machine of the type having a timer drum with a plurality of pneumatic control valves arranged in side by side relationship and operated in sequence to control the formation of a blown glass object, said drum having reciprocatory push members, pneumatic valves actuated thereby, the combination therewith of readily removable pivotally connected levers to operate said push members, said timer drum operating said levers, said lever system including a rotatable flatted shaft, each of said levers having a slotted pivot and pivotally mounting said lever on said shaft, said slotted pivot end of each lever being so shaped and dimensioned relative to flat portions on the shaft that when the shaft is in a predetermined rotative position each lever may be removed by pulling the lever forwardly so that the slot in the lever slides over the flat portions of the shaft and when the shaft is out of said predetermined rotative position removal of said levers is prevented, and means to rotate said shaft to permit removal of the pivot ends over the flattened shaft positions, said means including a rotatable partition gear member and a forwardly extending rod accessible from the front of the machine for rotation of said shaft, said levers being vertically reciprocable and thin and flat in the direction of the pivotal axis and being positioned closely spaced in side by side relationship and stop means to stop the levers in their vertical movements, guide means positioned below the pivot ends of said levers to contact and guide the pivot ends of the levers upon removal movement and said stop means being positioned above the levers and at one side of the levers, an actuator at the forward ends of the levers away from the pivot ends and adjustable elements to regulate the amount of movement of said levers.

16. A valve operating lever system for use with a glass molding machine of the type having a timer drum with a plurality of pneumatic control valves arranged in side by side relationship and operated in sequence to control the formation of a blown glass object, said drum having reciprocatory push members, pneumatic valves actuated thereby, the combination therewith of readily removable pivotally connected levers to operate said push members and a timer drum operating said lever, said lever system including a rotatable flatted shaft, each of said levers having a slotted pivot and pivotally mounting said lever on said shaft, said slotted pivot and each lever being so shaped and dimensioned relative to flat portions on the shaft that when the shaft is in a predetermined rotative position each lever may be removed by pulling the lever forwardly so that the slot in the lever slides over the flat portions of the shaft and when the shaft is out of said predetermined rotative position removal of said levers is prevented, and means to rotate said shaft to permit removal of the pivot ends over the flatted shaft positions, said shaft having stop members to limit the movement thereof either to position of said flat transverse member to the longitudinal axis of said lever or parallel to the horizontal axis of said lever, said levers being vertically reciprocable and thin and flat in the direction of the pivotal axis and being positioned closely spaced in side by side relationship and stop means to stop the levers in their vertical movements, guide means positioned below the pivot ends of said levers to contact and guide the pivot ends of the levers upon removal movement and said stop means being positioned above the levers and at one side of the levers, an actuator at the forward ends of the levers away from the pivot ends and adjustable elements to regulate the amount of movement of said levers.

17. A valve operating lever system for use with a glass molding machine of the type having a timer drum with a plurality of pneumatic control valves arranged in side by side relationship and operated in sequence to control the formation of a blown glass object, said drum having reciprocatory push members, pneumatic valves actuated thereby, the combination therewith of readily removable pivotally connected levers to operate said push members and a timer drum operating said lever, said lever system including a rotatable flatted shaft, each of said levers having a slotted pivot and pivotally mounting said lever on said shaft, said slotted pivot end of each lever being so shaped and dimensioned relative to flat portions on the shaft that when the shaft is in a predetermined rotative position each lever may be removed by pulling the lever forwardly so that the slot in the lever slides over the flat portions of the shaft and when the shaft is out of said predetermined rotative position removal of said levers is prevented, and means to rotate said shaft to permit removal of the pivot ends over the flatted shaft positions, said means including a 90° gear with flat sides at 90° to each other to act as stops and limit the rotation of the shaft, said levers being vertically reciprocable and thin and flat in the direction of the pivotal axis and being positioned closely spaced in side by side relationship and stop means to stop the levers in their vertical movements, guide means positioned below the pivot ends of said levers to contact and guide the pivot ends of the levers upon removal movement and said stop means being positioned above the levers and at one side of the levers, an actuator at the forward ends of the levers away from the pivot ends and adjustable elements to regulate the amount of movement of said levers.

References Cited by the Examiner
UNITED STATES PATENTS

| | | | |
|---|---|---|---|
| 1,543,840 | 6/1925 | Grigoleit | 137—624.17 |
| 2,811,349 | 10/1957 | Bondurant | 287—3 X |
| 2,837,118 | 6/1958 | Allen | 137—624.17 X |
| 2,924,103 | 2/1960 | Hamilton | 74—2 |
| 2,946,346 | 7/1960 | Mead | 137—624.17 X |

ISADOR WEIL, *Primary Examiner.*

WILLIAM F. O'DEA, *Examiner.*